US012221806B2

(12) United States Patent
Tao et al.

(10) Patent No.: US 12,221,806 B2
(45) Date of Patent: Feb. 11, 2025

(54) UNMANNED RETAIL DEVICE, AUTOMATIC VENDING SYSTEM, AND SETTLEMENT METHOD AFTER POWERING OFF AND THEN POWERING ON

(71) Applicant: Hefei Midea Intelligent Technology Co., Ltd., Hefei (CN)

(72) Inventors: Haijin Tao, Hefei (CN); Xiufeng Lu, Hefei (CN)

(73) Assignee: HEFEI MIDEA INTELLIGENT TECHNOLOGY CO., LTD., Hefei (CN)

( * ) Notice: Subject to any disclaimer, the term of this patent is extended or adjusted under 35 U.S.C. 154(b) by 384 days.

(21) Appl. No.: 17/574,482

(22) Filed: Jan. 12, 2022

(65) Prior Publication Data

US 2022/0136284 A1 May 5, 2022

Related U.S. Application Data

(63) Continuation of application No. PCT/CN2020/093124, filed on May 29, 2020.

(30) Foreign Application Priority Data

Jul. 16, 2019 (CN) ......................... 201910639781.1

(51) Int. Cl.
*E05B 47/00* (2006.01)
*E05B 45/06* (2006.01)
(Continued)

(52) U.S. Cl.
CPC .......... *E05B 47/0002* (2013.01); *E05B 45/06* (2013.01); *E05B 65/52* (2013.01); *G07F 9/026* (2013.01); *E05B 2047/0057* (2013.01)

(58) Field of Classification Search
CPC ...... E05B 47/0002; E05B 45/06; E05B 65/52; E05B 2047/0057; G07F 9/026
See application file for complete search history.

(56) References Cited

U.S. PATENT DOCUMENTS 4,415,893 A * 11/1983 Roland ................ E05B 49/006 235/382
5,886,644 A * 3/1999 Keskin .................... G07F 17/12 70/276

(Continued)

FOREIGN PATENT DOCUMENTS

CN 105913518 A 8/2016
CN 207264487 U 4/2018

(Continued)

OTHER PUBLICATIONS

Midea Group Co., Ltd., ISRWO, PCT/CN2020/093124, Sep. 3, 2020, 8 pgs.

(Continued)

*Primary Examiner* — Mark A Williams
(74) *Attorney, Agent, or Firm* — Morgan, Lewis & Bockius LLP

(57) ABSTRACT

An unmanned retail device, an automatic vending system, and a settlement method after powering off and then powering on. The unmanned retail device includes a cabinet body, and a door body; an electric mortise lock configured to lock the door body and enable the door be latching when power failure occurs; a door opening/closing detection device configured to detect opening/closing of the door body; and a main control board electrically connected to the electric mortise lock and the door opening/closing detection device respectively and configured to control, when it is re-powered after power failure, the door opening/closing detection device to detect the opening/closing of the door body. The unmanned retail device is capable of resetting the (Continued)

electric mortise lock when it is re-powered after power failure in a power supply system, ensuring that the door body can be re-closed, and finishing shopping settlement of a last user.

10 Claims, 3 Drawing Sheets

(51) Int. Cl.

| | |
|---|---|
| ***E05B 65/52*** | (2006.01) |
| ***G07F 9/02*** | (2006.01) |

(56) References Cited

U.S. PATENT DOCUMENTS

| | | | | |
|---|---|---|---|---|
| 10,311,263 | B2 * | 6/2019 | Wang | G06Q 20/18 |
| 11,694,501 | B2 * | 7/2023 | Friend | G07F 9/026 700/236 |
| 11,821,236 | B1 * | 11/2023 | Yee | E05B 47/0002 |
| 2004/0103033 | A1 * | 5/2004 | Reade | G07G 1/0045 705/16 |
| 2010/0010903 | A1 * | 1/2010 | Jeong | G07F 9/02 726/16 |
| 2014/0032413 | A1 * | 1/2014 | Low | G07F 9/026 705/44 |
| 2018/0300681 | A1 * | 10/2018 | Gaur | G06Q 20/203 |
| 2019/0114453 | A1 * | 4/2019 | Wang | G06K 7/1417 |
| 2021/0084021 | A1 * | 3/2021 | Gibson | H04L 63/0807 |

FOREIGN PATENT DOCUMENTS

| | | | |
|---|---|---|---|
| CN | 207895558 | U | 9/2018 |
| CN | 108961546 | A | 12/2018 |
| CN | 109057562 | A | 12/2018 |
| CN | 110428545 | A | 11/2019 |
| JP | 2001273552 | A | 10/2001 |

OTHER PUBLICATIONS

Midea Group Co., Ltd., IPRP, PCT/CN2020/093124, Jan. 18, 2022, 6 pgs.

* cited by examiner

UNMANNED RETAIL DEVICE, AUTOMATIC VENDING SYSTEM, AND SETTLEMENT METHOD AFTER POWERING OFF AND THEN POWERING ON

CROSS-REFERENCE TO RELATED APPLICATION

The present application is a continuation of PCT International Application No. PCT/CN2020/093124, filed May 29, 2020 entitled "Unmanned Retail Device, Automatic Vending System, and Settlement Method After Powering Off and Then Powering On," which claims priority to Chinese Application No. 201910639781.1 filed on Jul. 16, 2019, entitled "Unmanned Retail Device, Automatic Vending System, and Settlement Method after Powering Off and Then Powering On Repowering," the entire contents of which are hereby incorporated by reference.

FIELD OF TECHNOLOGY

The present application relates to the technical field of unmanned retail device, in particular to an unmanned retail device, an automatic vending system, and a settlement method used when it is re-powered after power failure.

BACKGROUND

Nowadays, for security reasons, common commercially available electric mortise locks generally automatically latch after a power failure. Provided that an electric mortise lock is applied to an unmanned retail device, once a user encounters a power failure during shopping, the door would be latching while in an opening state. In this case, the door cannot be closed, even if it is repowered. The novel unmanned retail device adopts the method of opening the door by scanning code by a mobile phone, and paying automatically by closing the door, thus the user cannot finish a settlement normally if the door cannot be closed correctly. In addition, when a door is open but it is latching, the user can temporarily address the issue by manually contacting customer service for remote control unlatching, whereas it is not possible to control the lock to be reset when it is repowered after a power failure. As a result, the security and experience of using this electric mortise lock are greatly affected. In addition, because the system in the unmanned retail device does not have a power-off memory function, it is impossible to detect whether there has been a power-off situation when it is repowered.

SUMMARY

(I) Technical Problems to be Solved

An objective of the present application is to provide an unmanned retail device, a vending system and a settlement method used when repowering after a power failure so as to solve the technical problem that the electric mortise lock of the unmanned retail device in the prior art will automatically latch when a power failure occurs and thus the door cannot be closed, as well as the lock will not be reset when repowering, which causes a user to be unable to perform a settlement normally.

(II) Technical Solutions

In order to solve at least the above-mentioned technical problems, according to a first aspect of the present application, an unmanned retail device is provided, including a cabinet body, and a door body disposed on the cabinet body, further including: an electric mortise lock disposed between the cabinet body and the door body and configured to lock the door body, the electric mortise lock being automatically latching when power failure occurs; a door opening/closing detection device configured to detect opening/closing of the door body; and a main control board electrically connected to the electric mortise lock and the door opening/closing detection device respectively, and configured to control, when it is re-powered after power failure, the door opening/closing detection device to detect the opening/closing of the door body; when it is detected that the door body is opened, the door opening/closing detection device being configured to send a signal indicating opening of the door body to the main control board to allow the main control board to control the electric mortise lock to be reset.

In some embodiments, the electric mortise lock includes: a first lock piece disposed on the cabinet body; a second lock piece disposed on the door body and opposite to the first lock piece, a lock hole penetrating into the door body being formed on the second lock piece; and a latch bolt disposed on the first lock piece, the latch bolt being matched with the lock hole.

In some embodiments, the electric mortise lock further includes a magnetic part disposed on one of the first lock piece and the second lock piece and a magnetic induction part disposed on the other one.

In some embodiments, the door opening/closing detection device includes a proximity switch, and an infrared induction sensor or a door magnetic induction sensor.

In some embodiments, the unmanned retail device further includes an alarm module electrically connected to the main control board.

According to a second aspect of the present application, provided is a settlement method of the unmanned retail device, when it is re-powered after power failure, the method includes: invoking settlement information of a last user, and determining that the last user's shopping is not settled; determining that the door body is not closed; resetting the electric mortise lock; and determining that the door body is closed and finishing settlement and deduction.

In some embodiments, the method further includes: ending the method when it is determined that last user's shopping is settled.

In some embodiments, the method further includes: performing a settlement deduction when it is determined that the last user's shopping is not settled and the door body is closed.

According to a third aspect of the present application, provided is a non-transitory computer-readable storage medium, having stored thereon computer programs, wherein when the computer programs are executed by a processor, the processor implements the above-mentioned method.

According to a fourth aspect of the present application, provided is an automatic vending system based on unmanned retail device, including an unmanned retail device, a server, and a user terminal, wherein the server is configured to implement the above-mentioned method.

(III) Beneficial Effects

Compared with the prior art, the unmanned retail device provided by the present application has the following advantages.

When an abnormal power failure occurs in the power supply system of the unmanned retail device, the electric mortise lock will automatically latch. After the power supply equipment in the unmanned retail device is repowered, firstly, the last user's settlement information is invoked through the main control board to determine whether the last user's shopping has been settled. If the last user's shopping has not been settled, the door opening/closing detection device is used to determine whether the door body is closed, if the door body is not closed, the electric mortise lock is reset through the main control board, namely, the electric mortise lock is reset from the current latching state to the initial lifting state, and then the main control board is used to control the door opening/closing detection device to determine whether the door body is in a closed state; if the door body is already in the closed state, the payment will be deducted, through which the shopping settlement of the last user has been completed, and the normal shopping of the next user can be started. It follows that the unmanned retail device of the present application is capable of resetting the electric mortise lock when it is repowered after the power supply system is powered off and to ensure that the door body can be closed correctly to complete the shopping settlement of the last user.

REFERENCE NUMERALS

1: cabinet body; 2: door body; 3: electric mortise lock; 31: first lock piece; 32: second lock piece; 321: lock hole; 33: latch bolt; 34: magnetic part; 35: magnetic induction part; 4: door opening/closing detection device; 5: main control board; 6: alarm module; 7: automatic-closing device.

DETAILED DESCRIPTION

Specific implementations of the present application will be described in further detail below in conjunction with accompanying drawings and embodiments. The following embodiments are used to illustrate the present application, but not to limit the scope of the present application.

With respect to the description of the embodiments of the present application, unless otherwise clearly specified or defined, it should be noted that the terms "install," "connect with," and "connect to" should be understood in a broad sense, as an illustration, it can be a fixed connection, a detachable connection, or an integral connection; it can be mechanically or electrically connected, directly connected, indirectly connected through an intermediary, or an internal communication between two components. For those of ordinary skill in the art, the specific meaning of the above terms in the present application can be understood according to the specific situations.

Figure 1:
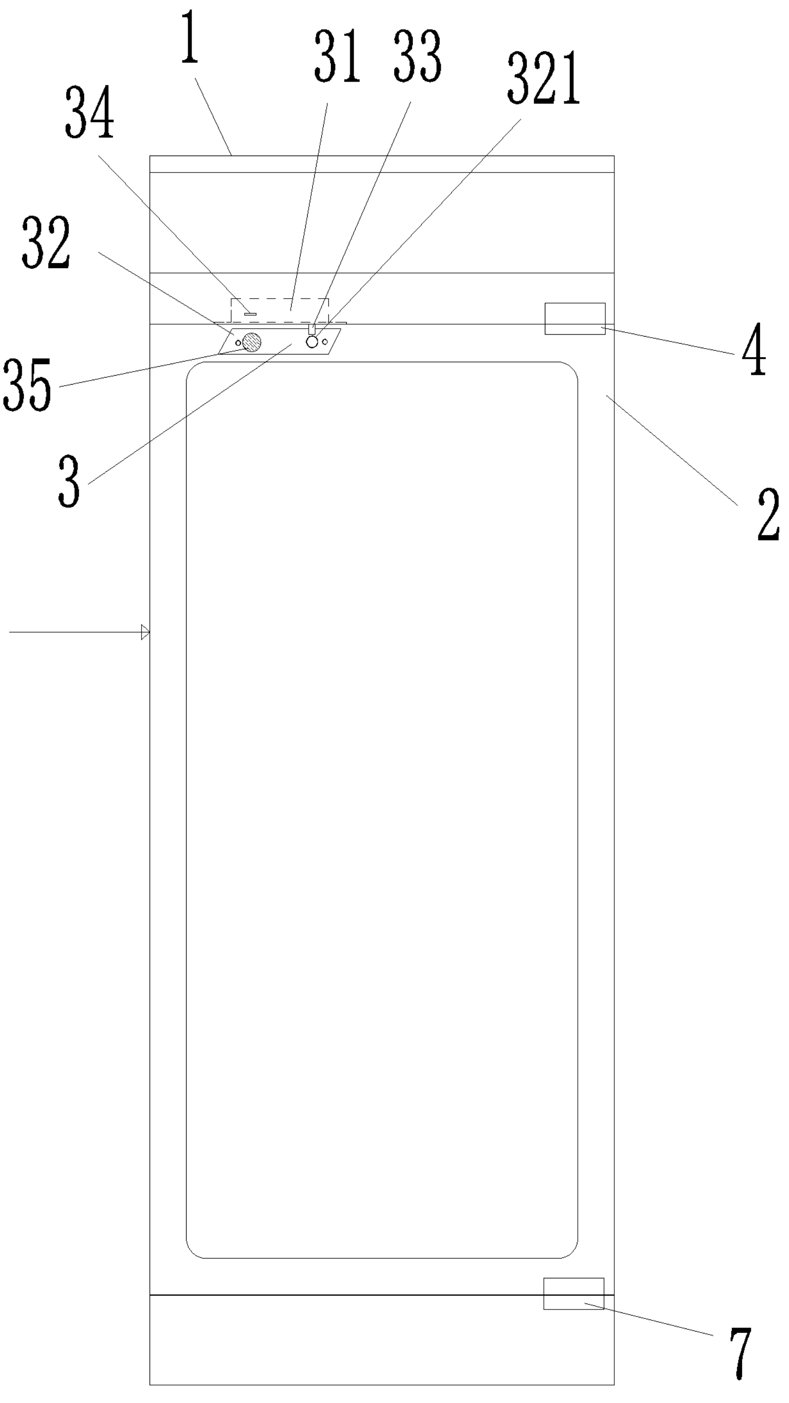
FIG. 1 is a schematic diagram showing the overall structure of an unmanned retail device according to some embodiments of the application.
Figure 2:
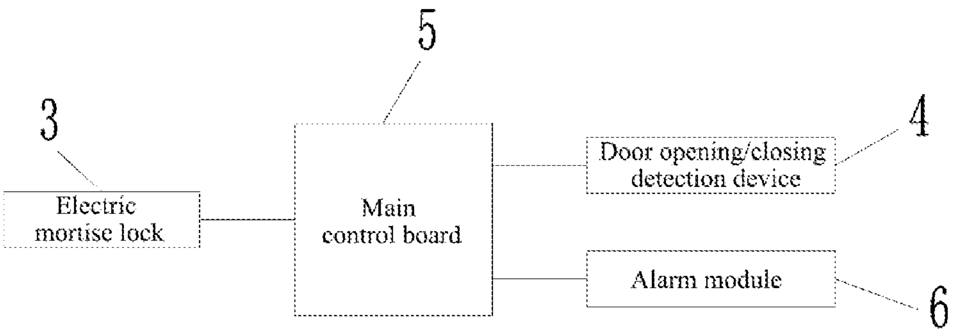
FIG. 2 is a block diagram showing connection of a main control board, an electric mortise lock, a door opening/closing detection device, and an alarm module of an unmanned retail device according to some embodiments of the present application.

FIGS. 1 and 2 schematically shows an unmanned retail device, including a cabinet body 1, a door body 2, an electric mortise lock 3, a door opening/closing detection device 4 and a main control board 5.

In some embodiments of the present application, the unmanned retail device includes a cabinet body 1 and a door body 2 disposed on the cabinet body 1. The door body 2 may be pivotally arranged on the cabinet body 1 for opening and closing the cabinet body 1.

The electric mortise lock 3 is disposed between the cabinet body 1 and the door body 2 and is configured to lock the door body 2, and the electric mortise lock 3 is automatically latching when power failure occurs.

The door opening/closing detection device 4 is configured to detect the opening and closing of the door body 2. It should be noted that the door opening/closing detection device 4 may be installed on the cabinet body 1 or on the door body 2.

The main control board 5 is electrically connected to the electric mortise lock 3 and the door opening/closing detection device 4 respectively, and is configured to control, when it is re-powered after power failure, the door opening/closing detection device 4 to detect the opening/closing of the door body 2. When detecting that the door body 2 is opened, the door opening/closing detection device 4 sends a signal indicating that the door body 2 is opened to the main control board 5, and the main control board 5 controls the electric mortise lock 3 to be reset. Specifically, when an power failure occurs abnormally in the power supply system of the unmanned retail device, the electric mortise lock 3 will automatically latch. When the power supply system of the unmanned retail device is repowered, firstly, the last user's settlement information is invoked through the main control board 5 to determine whether the last user's shopping has been settled. If the last user's shopping has not been settled, the door opening/closing detection device 4 is used to determine whether the door body 2 is closed, if the door body 2 is not closed, the electric mortise lock 3 is reset through the main control board 5, namely, the electric mortise lock 3 is reset from the current latching state to the initial lifting state, and then the main control board 5 is used to control the door opening/closing detection device 4 to determine whether the door body 2 is in a closed state. When the door body 2 is already in the closed state, the payment will be deducted, through which the shopping settlement of the last user has been finished, and the normal shopping of the next user can be started. It follows that the unmanned retail device of the present application is capable of resetting the electric mortise lock 3 when it is repowered after a power failure occurs in the power supply system to ensure that the door body 2 can be closed again to finish the shopping settlement of the last user. In addition, in the present application, since the door opening/closing detection device 4 having a structure independent of the electric mortise lock 3 is used to detect the opening/closing state of the door body 2, good versatility is provided.

The main control board 5 is used to reset the electric mortise lock 3, thereby eliminating the need for remote control and avoiding the situation that the electric mortise lock 3 cannot be controlled due to remote forced unlocking.

In addition, in the present application, the door opening/closing detection device 4 is provided and the main control board 5 is used to invoke the checkout deduction information of the last user. Based on the controlling of the main control board 5, a series of operations such as automatic unlocking, closing door, and latching can be performed when a power failure occurs, thereby effectively avoiding the loss of the merchant.

It should be noted that the direction indicated by the arrow shown in FIG. 1 is an opening side for a door.

As shown in FIGS. 1 and 2, in some preferred embodiments of the present application, the electric mortise lock 3 includes a first lock piece 31, which may be fastened to the cabinet body 1 by screws or rivets.

A second lock piece 32 is disposed on the door body 2 and opposite to the first lock piece 31, and a lock hole 321 penetrating into the door body 2 is formed on the second lock piece.

A latch bolt 33 is disposed on the first lock piece 31, and the latch bolt 33 is matched with the lock hole 321. Specifically, when the door body 2 is normally closed, the electric mortise lock 3 will automatically latch, and the latch bolt 33 will be inserted into the lock hole 321. As a result, the door body 2 will not be opened in the case of abnormal operation, thus avoiding the loss of goods in the unmanned retail device.

It should be understood that the latch bolt 33 and the lock hole 321 are disposed opposite to each other in an up and down direction. In this way, it can be ensured that the latch bolt 33 can be inserted successfully into the lock hole 321 in the event that the electric mortise lock 3 is latched.

It should be noted that in the case of an abnormal power failure in the power supply system of the unmanned retail device, for instance, during the process of purchasing goods after a user scanning the code and opening the door body 2, the power supply system suddenly encounters an abnormal power failure, the electric mortise lock 3 will automatically latch, namely the latch bolt 33 will extend out. In this case, the latch bolt 33 will interfere with and block the door body 2 from closing, and the door body 2 cannot be closed successfully under the blocking effect of the latch bolt 33. Therefore, it is necessary to reset the electric mortise lock 3 by the main control board 5, so that the latch bolt 33 can be reset to an initial state, namely the latch bolt 33 will retract to the interior of the cabinet body 1. In this case, the door body 2 can be closed successfully, thus allowing the user to finish the settlement deduction successfully.

In some embodiments of the present application, the unmanned retail device may be an unmanned merchandise vending cabinet, an unmanned cold beverage retail cabinet, an unmanned fruit vending cabinet, and the like.

In some embodiments of the present application, the first lock piece 31 and the second lock piece 32 are preferably manufactured from aluminum.

It should also be noted that the first lock piece 31 and the second lock piece 32 can be installed at positions such as the opening side of the door body 2, or the top or bottom of the door body 2, as long as the door body 2 can be closed and the latch bolt 33 can be successfully inserted into the lock hole 321. The specific installation position of the first lock piece 31 and the second lock piece 32 is not defined.

It can be understood that, in order to facilitate the insertion of the latch bolt 33 into the lock hole 321, the lock hole 321 may have a size slightly larger than the dimension of the latch bolt 33. Preferably, the size of the lock hole 321 may be 1 cm to 2 cm larger than the dimension of the latch bolt 33.

In other embodiments of the present application, the unmanned retail device further includes an automatic-closing device 7, the automatic-closing device 7 includes a first mounting base disposed on the door body 2, a first connecting rod connected to the first mounting base, a second connecting rod hinged to the first connecting rod, and a second mounting base disposed on the cabinet body 1 and connected to the second connecting rod. The automatic-closing device 7 is generally disposed at the corner of the door body 2 to automatically close the door body 2. After the user scans the code and opens the door body 2, a certain amount of force is required to keep the door body 2 in an opening state. Once the user leaves, the automatic-closing device 7 will automatically close the door body 2 when it is not blocked, thereby effectively preventing deduction errors from occurring when a user forgets to close the door and leave.

As shown in FIG. 1, in some preferred embodiments of the present application, the electric mortise lock 3 further includes a magnetic part 34 disposed on one of the first lock piece 31 and the second lock piece 32, and a magnetic induction part 35 disposed on the other one. Specifically, when the magnetic induction part 35 senses a magnetic signal from the magnetic part 34, the electric mortise lock 3 will automatically latch, namely the latch bolt 33 will be inserted into the lock hole 321. It should be noted that when the magnetic induction part 35 and the magnetic part 34 are gradually approaching to each other, the magnetic induction part 35 will be able to sense the magnetic signal of the magnetic part 34; and on the contrary, when the magnetic induction part 35 and the magnetic part 34 are gradually moving away from each other, the magnetic signal of the magnetic part 34 sensed by the magnetic induction part 35 will gradually weaken or even disappear, at which point the electric mortise lock 3 is in the state of lifting and resetting, and the door body 2 can be opened.

In some specific embodiments, the magnetic part 34 is preferably a magnet, and the magnetic induction part 35 is preferably a Hall element.

As shown in FIG. 1, in other preferred embodiments of the present application, the door opening/closing detection device 4 includes a proximity switch, and an infrared sensor or a door magnetic sensor. Specifically, the proximity switch can also be called a travel switch or a touch switch, and when the door body 2 is opened and closed, two signals will be sent out respectively.

As for the infrared sensor, a transmitter module and a receiver module are installed at corresponding positions of the door body 2 and the cabinet body 1. When the door body 2 becomes closer to the cabinet body 1 until it is a certain distance away from the cabinet body 1, the receiver module will detect the signal sent by the transmitter module and provide the door body 2 a signal for closing, otherwise, provide the door body 2 a signal for opening.

The working principle of the door magnetic sensor is as follows: the door magnetic sensor, composed of a wireless transmitter module and a magnetic block, is used to detect whether the door, window or drawer has been illegally opened or moved; a "reed switch" type component is installed at the wireless transmitter module; when the distance between the magnetic block and the reed switch is maintained at 1.5 cm (an adjustable regular distance), the reed switch will be in a disconnected state, when the distance between the magnetic block and the reed switch exceeds 1.5 cm, the reed switch will be in a connected state.

As shown in FIG. 2, in some preferred embodiments of the present application, the unmanned retail device further includes an alarm module 6 which is electrically connected to the main control board 5. Specifically, when the power supply system of the unmanned retail device is out of power, the alarm module 6 will transmit the detection result of the door opening/closing detection device 4 and the alarm information to a staff to remind the staff to pay attention in time. Therefore, it can be ensured that the door body 2 can be restored to a state in which it is able to be normally closed in a short time when the power supply system is out of power, so as to ensure that the user can perform settlement and deduction normally after shopping.

Figure 3:
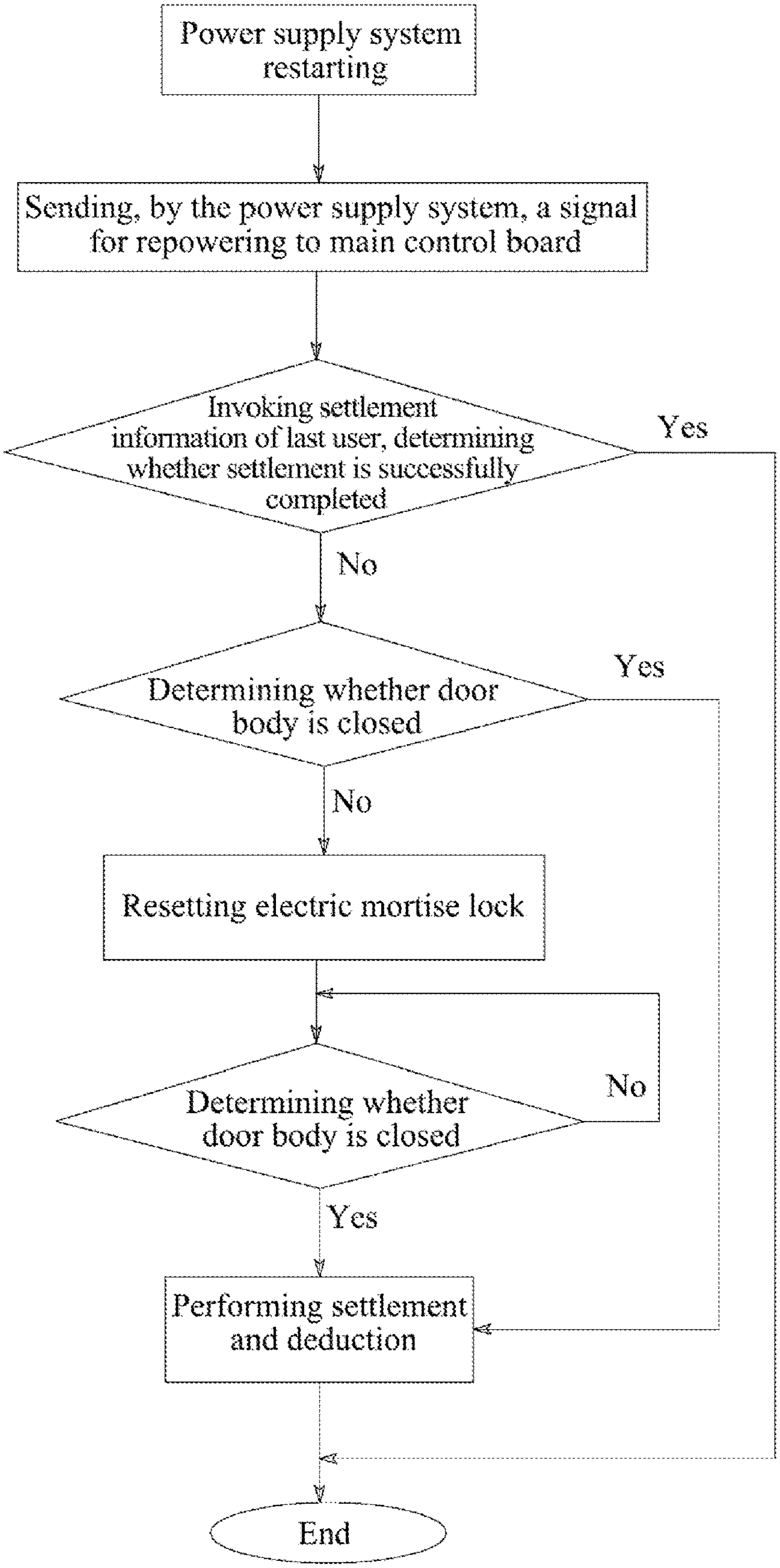
FIG. 3 is a schematic flowchart of a settlement method of an unmanned retail device used when it is repowered after a power failure according to some embodiments of the application.

As shown in FIG. 3, according to a second aspect of the present application, provided is a settlement method of an unmanned retail device, when it is re-powered after power failure, the method includes:

step 1, invoking settlement information of a last user, and determining that the last user's shopping is not settled;
step 2, determining that the door body 2 is not closed;
step 3, resetting the electric mortise lock 3; and
step 4, determining that the door body 2 is closed and finishing settlement and deduction.

In other preferred embodiments of the present application, when it is determined that the shopping settlement of the last user is finished, the process of method ends.

In other preferred embodiments of the present application, when it is determined that the last user's shopping is not settled and the door body 2 is closed, settlement and deduction are performed.

Specifically, when power failure occurs in the power supply system of the unmanned retail device, the electric mortise lock 3 will automatically latch. After the power supply equipment in the unmanned retail device is repowered, firstly, the last user's settlement information is invoked through the main control board 5 to determine whether the last user's shopping has been settled. If the last user's shopping has not been settled, the door opening/closing detection device 4 is employed to determine whether the door body 2 is closed, if the door body 2 is not closed, the electric mortise lock 3 is reset through the main control board 5, namely, the electric mortise lock 3 is reset from the current latching state to the initial lifting state, and then the main control board 5 is used to determine whether the door body 2 is in a closed state; if the door body 2 is already in the closed state, the payment will be deducted, through which the shopping settlement of the last user has been completed, and the normal shopping of the next user can be started. It follows that the unmanned retail device of the present application is capable of resetting the electric mortise lock 3 when the power supply system is repowered after a power failure occurs in it to ensure that the door body 2 can be closed again to complete the shopping settlement of the last user.

In the above-mentioned steps, the purpose of step 1 is to detect whether there is an abnormal interruption in the last user's shopping. If yes, because the electric mortise lock 3 will automatically latch when the power failure, it means that there is a high probability that: although the electric mortise lock 3 has been latched, the door body 2 has not been closed. In this case, it is necessary to use the door opening/closing detection device 4 to determine the opening/closing state of the door body 2.

In steps 2 to 4, when it is detected by the door opening/closing detection device 4 that the door body 2 is not closed, and in this case, because the electric mortise lock 3 is latching, it is necessary to reset the electric mortise lock 3 through the main control board 5, namely to unlock the electric mortise lock 3; then normal shopping is available, and if the user closes the door after shopping, automatic settlement will be performed.

Further, in step 4, a reminder function can be added to remind or warn the user that "the settlement is abnormal due to power failure, please close the door for settlement immediately, if you would like to shop, please close the door and rescan the code and then open the door for shopping," so as to avoid deduction errors due to the current user being different from the user before the power failure.

It should be noted that before step 1, provided that the power supply system of the unmanned retail device is out of power while the user is shopping, once the power supply system of the unmanned retail device restarts, the power supply system will send a signal to the main control board 5, and after the main control board 5 receives the signal, it will start to perform the operations from steps 1 to 4.

According to a third aspect of the present application, provided is a non-transitory computer-readable storage medium, having stored thereon computer programs, when the computer programs are executed by a processor, the processor implements the above-mentioned settlement method of the unmanned retail device used when it is repowered after power failure.

According to a fourth aspect of the present application, provided is an automatic vending system based on unmanned retail device, including an unmanned retail device, a server, and a user terminal, wherein the server is configured to implement the above-mentioned settlement method of the unmanned retail device used when it is repowered after power failure.

In summary, when an abnormal power failure occurs in the power supply system of the unmanned retail device, the electric mortise lock 3 will automatically latch. After the power supply equipment of the unmanned retail device is repowered, firstly, the last user's settlement information is invoked through the main control board 5 to determine whether the last user's shopping has been settled. If the last user's shopping has not been settled, the door opening/closing detection device 4 is employed to determine whether the door body 2 is closed, if the door body 2 is not closed, the electric mortise lock 3 is reset through the main control board 5, namely, the electric mortise lock 3 is reset from the current latching state to the initial lifting state, and then the main control board 5 is used to control the door opening/closing detection device 4 to determine whether the door body 2 is in a closed state; if the door body 2 is already in the closed state, the payment will be deducted, through which the shopping settlement of the last user has been completed, and the normal shopping of the next user can be started. It follows that the unmanned retail device of the present application is capable of resetting the electric mortise lock 3 when it is repowered after the power supply system is powered off to ensure that the door body 2 can be closed again to complete the shopping settlement of the last user. In addition, in the present application, since the door opening/closing detection device 4 having a structure independent of the electric mortise lock 3 is used to detect the opening/closing state of the door body 2, good versatility is provided.

The main control board 5 is used to reset the electric mortise lock 3, thereby eliminating the need for remote control and avoiding the situation that the electric mortise lock 3 cannot be controlled due to remote forced unlocking.

In addition, in the present application, the door opening/closing detection device 4 is equipped and the checkout deduction information of the last user is invoked through the main control board 5. The control by the main control board 5 enables a series of actions such as automatic unlocking, closing door, and latching after a power failure, thereby effectively avoiding the loss of the merchant.

The above-mentioned are only preferred embodiments of the present application and are not intended to limit the present application. Any modification, equivalent substitution and improvement made within the principle of the present application shall be included in the protection scope of the present application.

What is claimed is:

1. An unmanned retail device, comprising:
a cabinet body, and a door body disposed on the cabinet body, wherein the unmanned retail device further comprises:
an electric mortise lock disposed between the cabinet body and the door body and used for locking the door body with respect to the cabinet body, wherein the electric mortise lock is configured to automatically latch when a power failure occurs;
a detection device for detecting opening/closing of the door body; and
a main control board electrically connected to the electric mortise lock and the detection device respectively, wherein the unmanned retail device is configured to
(a) after the unmanned retail device is repowered after a power failure, in response to the detection device detecting that that the door body is opened: send, by the detection device, a signal to the main control board; and
(b) in response to receiving the signal sent by the detection device, the main control board resets the electric mortise lock from a latching state to a lifting state.

2. The unmanned retail device of claim 1, wherein the electric mortise lock comprises:
a first lock piece disposed on the cabinet body;
a second lock piece disposed on the door body and opposite to the first lock piece, a lock hole penetrating into the door body being formed on the second lock piece; and
a latch bolt disposed on the first lock piece and fitting with the lock hole.

3. The unmanned retail device of claim 2, wherein the electric mortise lock further comprises a magnetic part disposed on one of the first lock piece and the second lock piece and a magnetic induction part disposed on the other one of the first lock piece and the second lock piece.

4. The unmanned retail device of claim 1, wherein the detection device comprises a proximity switch, and an infrared induction sensor or a door magnetic induction sensor.

5. The unmanned retail device of claim 1, further comprising an alarm module electrically connected to the main control board.

6. A settlement method of the unmanned retail device of claim 1, the method comprising:
after the unmanned retail device is re-powered after the power failure, invoking settlement information of a last user;
in accordance with a determination that the last user's shopping has not settled:
in accordance with a determination that a door body of the unmanned retail device is not closed, resetting an electric mortise lock of the unmanned retail device; and
in accordance with a determination that the door body of the unmanned retail device is closed, deducting a payment and completing a settlement.

7. The method of claim 6, further comprising:
in accordance with a determination that the last user's shopping has been settled, forgoing resetting of the electric mortise lock.

8. The method of claim 6, further comprising:
in accordance with a determination that the last user's shopping has not been settled:
in accordance with a determination that the door body of the unmanned retail device is closed, deducting the payment and completing the settlement.

9. A non-transitory computer-readable storage medium, having stored thereon computer programs, wherein when the computer programs are executed by a processor, the processor implements the method of claim 6.

10. An automatic vending system, comprising an unmanned retail device, a server, and a user terminal, wherein the server is configured to implement the method of claim 6.

* * * * *